US006965565B1

(12) United States Patent
Duclos

(10) Patent No.: US 6,965,565 B1
(45) Date of Patent: Nov. 15, 2005

(54) SYSTEM AND METHOD FOR COMMUNICATING AN EVENT STATUS ACROSS A DATA CHANNEL

(75) Inventor: Michael B. Duclos, Stow, MA (US)

(73) Assignee: 3Com Corporation, Marlborough, MA (US)

( * ) Notice: Subject to any disclaimer, the term of this patent is extended or adjusted under 35 U.S.C. 154(b) by 902 days.

(21) Appl. No.: 09/766,562

(22) Filed: Jan. 19, 2001

(51) Int. Cl.[7] .................................................. H04J 1/16
(52) U.S. Cl. ................. 370/235; 370/253; 370/395.61; 370/522
(58) Field of Search ............................... 370/252–253, 370/395.1, 235, 395.6, 395.61, 522

(56) References Cited

U.S. PATENT DOCUMENTS

| 5,493,566 A | * | 2/1996 | Ljungberg et al. ........... 370/231 |
| 5,550,819 A | * | 8/1996 | Duault ......................... 370/392 |
| 5,787,073 A | * | 7/1998 | Ikeda ........................... 370/236 |
| 5,835,484 A | * | 11/1998 | Yamato et al. ............... 370/230 |
| 5,933,607 A | * | 8/1999 | Tate et al. ............. 370/395.61 |
| 6,169,727 B1 | * | 1/2001 | Song ............................ 370/235 |
| 6,229,789 B1 | * | 5/2001 | Simpson et al. ............. 370/235 |
| 6,707,819 B1 | * | 3/2004 | Fraser et al. ............. 370/395.1 |

OTHER PUBLICATIONS

American National Standard for Telecommunications. "Broadband ISDN-ATM Adaption Layer for Constant Bit Rate Services Functionality and Specification" ; ANSI T1.CRB-199X DRAFT; Nov. 13, 1992.

* cited by examiner

Primary Examiner—Ricky Ngo
Assistant Examiner—Nittaya Juntima
(74) Attorney, Agent, or Firm—McDonnell Boehnen Hulbert & Berghoff

(57) ABSTRACT

A system for communicating an event status across a data channel is provided. The system includes a data path to provide connectivity for a plurality of communication channels using data transport protocols. An originating device is coupled to a first location on the data path, and is operable to set an event status indicator in a control portion of a data unit. The originating device is additionally operable to communicate a data signal as one or more data units on a data channel supported on the data path. A receiving device is coupled to a second location on the data path, and is operable to detect the event status indicator in the control portion of the data unit. The receiving device is additionally operable to convert the one or more data units communicated on the data channel to a recovered data signal. The event status indicator identifying an event status, such as a buffer overflow or underflow condition, or a line status, for example.

22 Claims, 20 Drawing Sheets

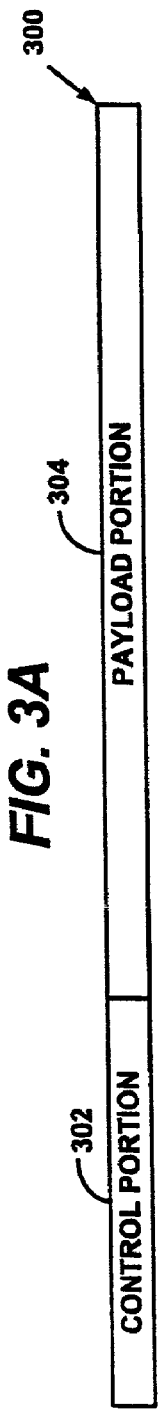
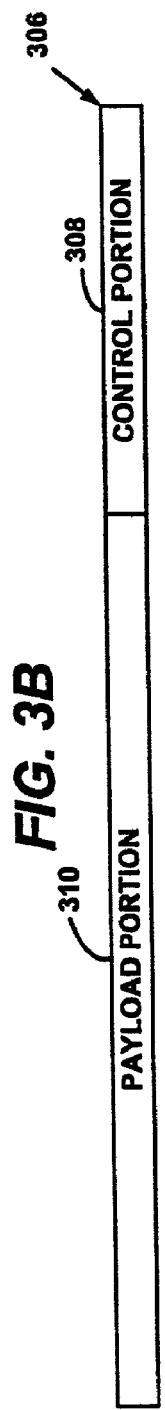
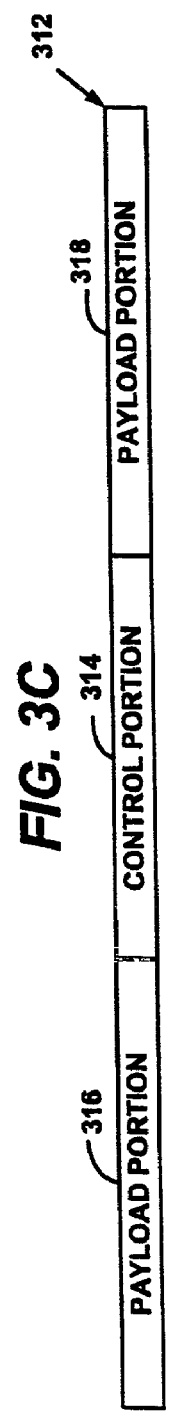

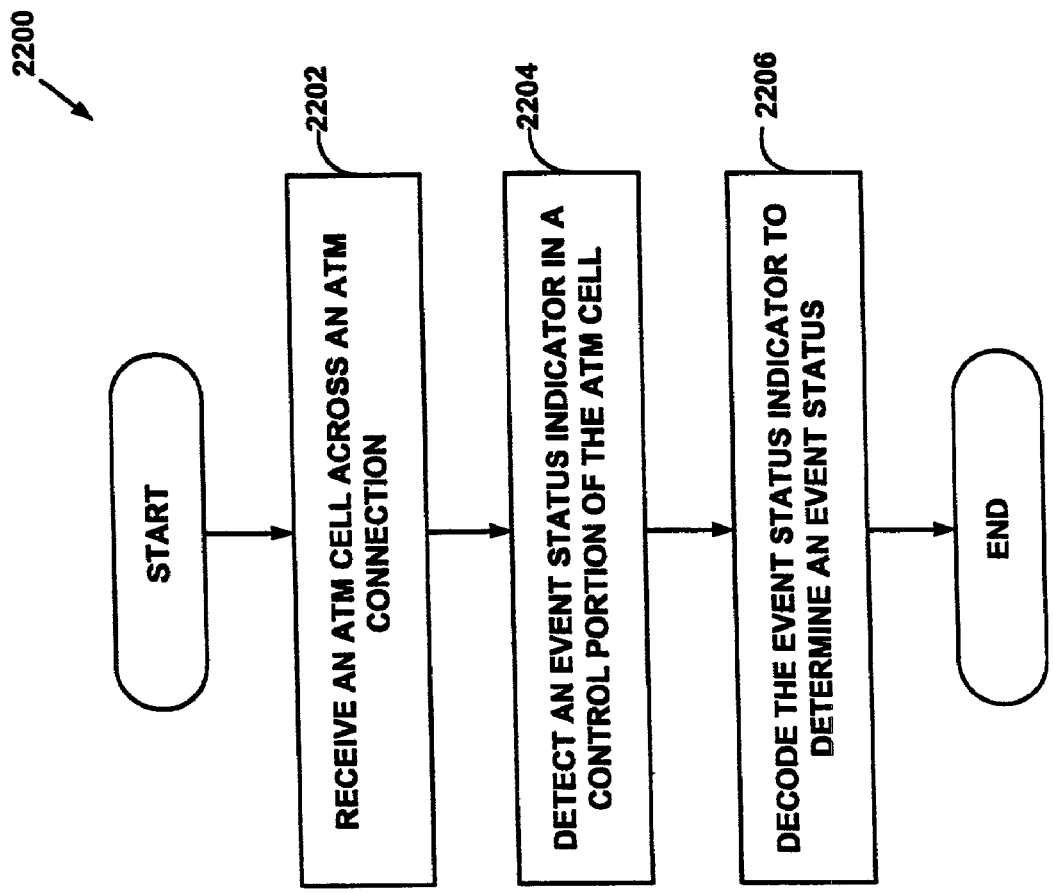

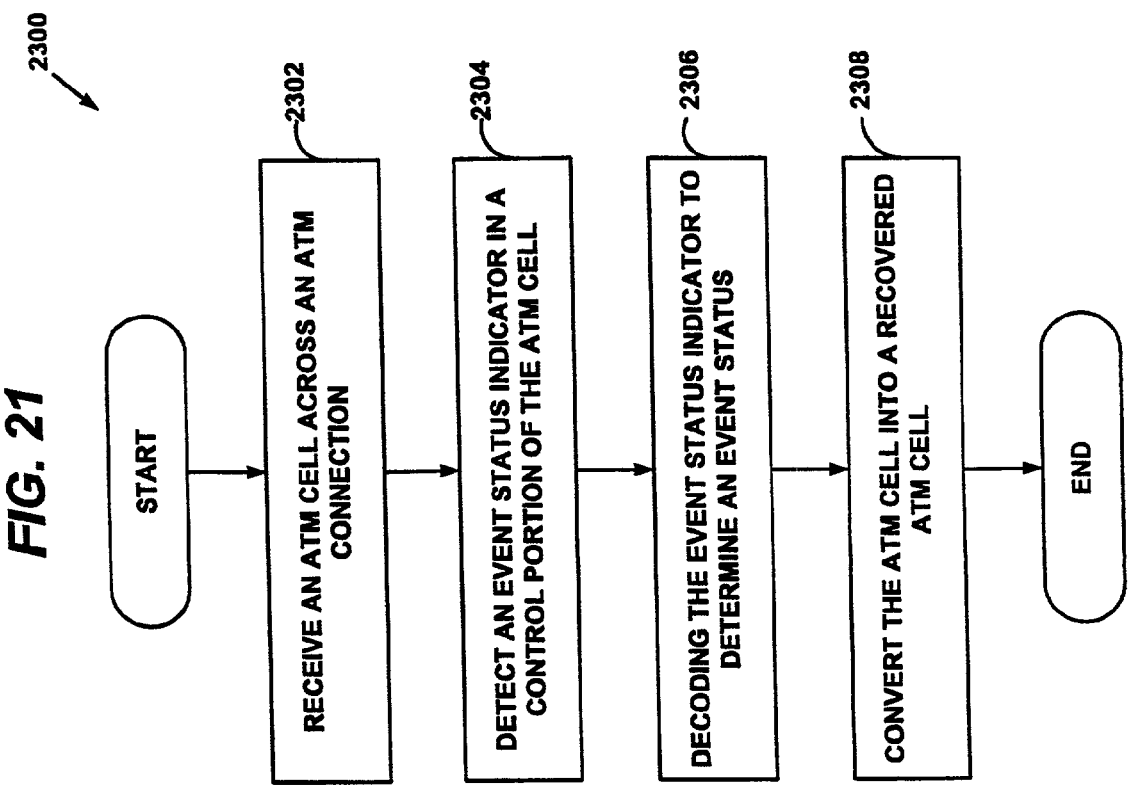

SYSTEM AND METHOD FOR COMMUNICATING AN EVENT STATUS ACROSS A DATA CHANNEL

FIELD OF THE INVENTION

The present invention relates to the communication of event status information from an originating device to a receiving device. More particularly, the present invention relates to a system and method for communicating an event status across a data channel.

BACKGROUND OF THE INVENTION

Improvements in data communication technology have revolutionized the exchange of information in business, education, government, and household settings. The rates of data transmission are increasing, and the reliability of data transmission media is improving, resulting in fast, efficient, and dependable data transfers between users.

Because much of the data communications infrastructure and supporting protocols have proved to be scalable, there are many similarities between modern data communications techniques and those used in earlier decades. Earlier data communications networks were more prone to errors, such as the loss of data during a transmission, and the corruption of data due to noise and other factors. As a result, many standards and specifications set forth extensive safeguards to ensure accurate data transmissions.

As data-networking devices and data transmission media have improved, the need for these safeguards may not be as great as it once was. Hence, resources used for providing these safeguards, such as Cyclic Redundancy Check (CRC) codes, might not be providing the benefits that they once may have provided.

A need may still exist for conveying event status information, such as an error condition, from a data-originating device (a transmitter) to a data-receiving device (a receiver). Several schemes have been developed to address the conveyance of event status information from an originating device to a receiving device. One such scheme involves transmitting the event status information on a communication channel that is separate from the communication channel in which the non-event-status information is being transmitted (i.e. the main data channel). For example, in an Asynchronous Transfer Mode (ATM) system, a separate virtual channel may be set up between an originating ATM device and a receiving ATM device to convey such event status information. But this technique may also be an inefficient use of resources, especially in a network that is overburdened or that needs the resources to provide specified levels of quality of service to users of the network.

Needed are a system and method for communicating an event status across a single data channel.

Also needed are a system and method for communicating an event status across an ATM connection.

A system and method for communicating an event status across an ATM connection, in which the data being transmitted is Constant Bit-Rate (CBR) data, would also be desirable.

SUMMARY OF THE INVENTION

In accordance with an illustrative embodiment of the present invention, some of the problems associated with communicating an event status are addressed.

In a first embodiment, a system for communicating an event status across a data channel is provided. The system includes a data path to provide connectivity for a plurality of communication channels using data transport protocols. An originating device is coupled to a first location on the data path, and is operable to set an event status indicator in a control portion of a data unit. The originating device is additionally operable to communicate a data signal as one or more data units on a data channel supported on the data path. A receiving device is coupled to a second location on the data path, and is operable to detect the event status indicator in the control portion of the data unit. The receiving device is additionally operable to convert the one or more data units communicated on the data channel to a recovered data signal. The event status indicator identifying an event status, such as a buffer overflow or underflow condition, or a line status, for example.

In a second embodiment, an apparatus for communicating an event status is provided, for use in an ATM device operable to transmit ATM cells via an ATM connection to a receiving ATM device. The apparatus includes an event status sensor operable to determine an event status, an encapsulation module operative to convert a data signal into one or more ATM cells, an event status injector operable to set an event status indicator in a control portion of an ATM cell, and a transmitter for communicating the ATM cell onto the ATM connection.

In a third embodiment, an apparatus for determining an event status is provided, for use in an ATM device operable to receive ATM cells via an ATM connection from an originating ATM device. The apparatus includes a receiver for accepting an ATM cell from the ATM connection, a decapsulation module operative to convert the ATM cell received from the originating ATM device on the ATM connection into a recovered data signal, an event status detector operable to detect an event status indicator in the control portion of the ATM cell, and an event status decoder operable to decode the event status indicator to determine an event status.

In a fourth embodiment, a method for communicating an event status across a data channel is provided. The method includes first determining an event status at an originating device. An event status indicator is set in a control portion of a data unit at the originating device. The event status indicator identifying an event status. The data unit is transmitted on a data channel from the originating device to a receiving device. The event status indicator is detected in the control portion of the data unit at the receiving device.

In a fifth embodiment, a method for communicating an event status is provided for use in a first ATM device operable to transmit ATM cells via an ATM connection to a second ATM device. The method includes setting an event status indicator in a control portion of an ATM cell, where the event status indicator signals an event status detected at the first ATM device. The ATM cell is transmitted across the ATM connection to the second ATM device.

In a sixth embodiment, a method for determining an event status is provided for use in a first ATM device operable to receive ATM cells via an ATM connection from a second ATM device. The method includes receiving an ATM cell across the ATM connection, where the ATM cell originates at the second ATM device. An event status indicator is detected in a control portion of the ATM cell. The event status indicator is then decoded to determine an event status.

The foregoing and other features and advantages of preferred embodiments of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein:

FIGS. 3A–D are simplified data unit maps illustrating exemplary data units that may be utilized in various embodiments of the present invention;

FIG. 20 is a flow diagram illustrating a method for determining an event status in a first ATM device operable to receive ATM cells from a second ATM device, according to an embodiment of the present invention; and FIG. 21 is a flow diagram illustrating a method for determining an event status in a first ATM device operable to receive ATM cells from a second ATM device, according to an embodiment of the present invention.

DETAILED DESCRIPTION OF THE PRESENTLY PREFERRED EMBODIMENTS

I. System for Communicating an Event Status Across a Data Channel

A. The System

Figure 1:
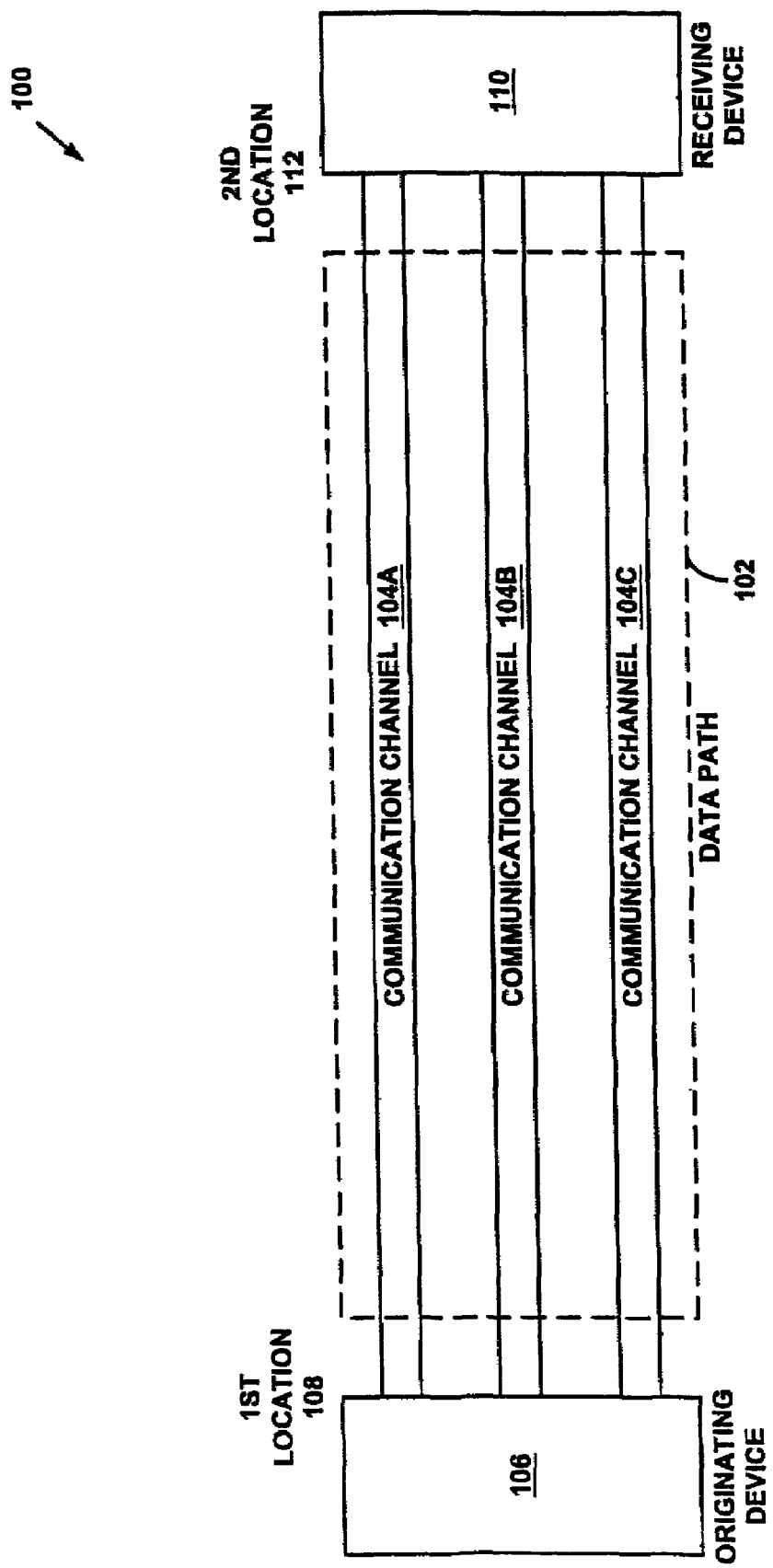
FIG. 1 is a simplified block diagram illustrating a system for communicating an event status across a data channel, according to an embodiment of the present invention.

FIG. 1 is a simplified block diagram illustrating a system 100 for communicating an event status across a data channel. The system 100 includes a data path 102 that provides connectivity for communication channels 104A–C using one or more data transport protocols. An originating device 106 is at a first location 108 on the data path 102. A receiving device 110 is at a second location 112 on the data path 102. The plurality of communication channels 104A–C enables communication between the originating device 106 and the receiving device 110. For example, the originating device 106 may communicate a data signal as one or more data units on a data channel, where the data channel is one of the plurality of communication channels 104A–C supported on the data path 102. The present invention may provide the most benefit in systems using fixed-length cells as data units for the transmission of Constant Bit-Rate (CBR) data.

Although the data path 102 is shown as a direct connection between the first location 108 and the second location 112, there may be intermediate network devices on the data path 102. Although three communication channels 104A–C are shown in the system 100, there may be only one such channel, or there may be another number of communication channels. Three communication channels are shown for exemplary purposes only. Other communication channels may also exist, providing connections to other devices not shown in FIG. 1. The data path 102 provides connectivity for communications channels 104A–C using well-known data transport protocols, such as TCP-IP, and others known to those having skill in the field of data communications.

The originating device 106 is operable to communicate an event status across the data channel on the data path 102 to the receiving device 110. The data channel is a communication channel used for the transmission of data. To communicate an event status, the originating device 106 sets an event status indicator in a control portion of a data unit, which is then communicated across the data channel to the receiving device 110. For example, the event status indicator may signal a buffer overflow condition by changing a series of bits in the control portion of the data unit to a non-standard sequence or to a pre-specified indication sequence. Other examples of event status include a buffer underflow condition or a line status. A First-In-First-Out (FIFO) buffer underflow condition may be indicated if the data rate is being monitored at the transmitting end. The line status may, for example, be an incoming line status, such as a Loss Of Signal condition on the incoming line. The actual event status is likely to be highly situational, and may differ depending on the particular application.

The receiving device 110 is operable to detect the event status indicator in the control portion of the data unit. The event status information is communicated in the control portion of the data unit, while a data signal is communicated in a payload portion of the data unit. The receiving device is operable to convert the one or more data units communicated on the data channel to a recovered data signal. The recovered data signal will be a copy of the data signal if the data transmission was error-free.

Figure 2:
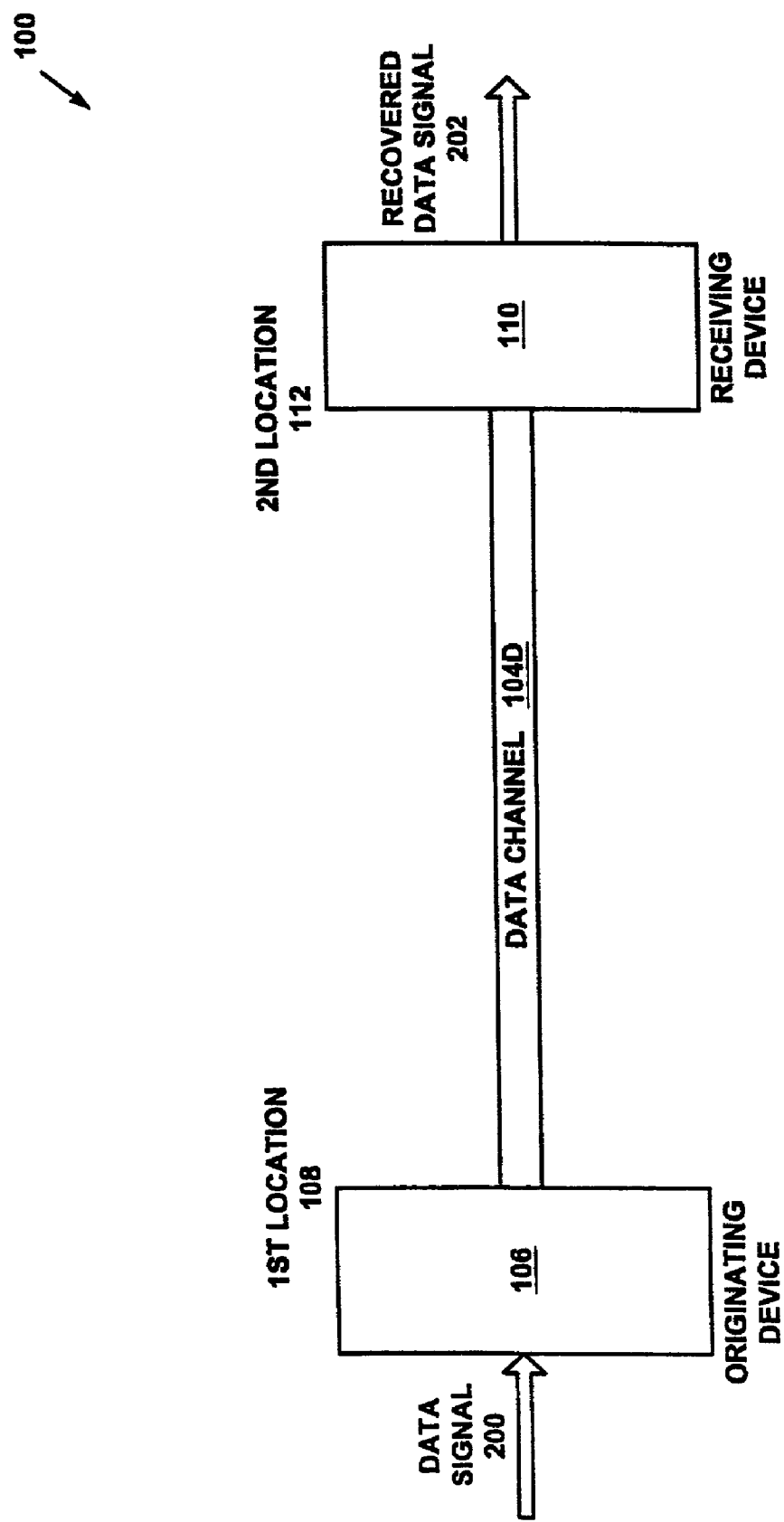
FIG. 2 is a simplified block diagram illustrating the system of FIG. 1 communicating a data signal from an originating device to a receiving device, according to an embodiment of the present invention.

FIG. 2 is a simplified block diagram illustrating the system 100 communicating a data signal 200 from the originating device 106 across a data channel 104D to the receiving device 110. A recovered data signal 202 is a representation of the data signal 200 and is produced by the receiving device 110. The recovered data signal 202 is preferably identical to the data signal 200. Although the originating device 106 and the receiving device 110 are shown as a transmitter and receiver, respectively, either or both of the originating device 106 and the receiving device 110 may be a transceiver, allowing communication in both directions using additional communication channels.

B. The Data Unit

FIGS. 3A–D are simplified data unit maps illustrating exemplary data units that may be utilized in various embodiments of the present invention. In FIG. 3A, a first data unit implementation 300 includes a header control portion 302 and a subsequent payload portion 304. FIG. 3B shows a second type of data unit 306 in which a control portion 308 is implemented as a trailer, following the payload portion 310. FIG. 3C shows a third type of data unit 312 in which a control portion 314 is neither a header nor trailer, but is, instead, positioned in an intermediate location within the data unit 312. A first payload portion 316 and a second payload portion 318 are also included in the data unit 312. Additional payload portions may also be included, as may additional control portions. In FIG. 3D, a fourth type of data unit 320 is shown, in which a header control portion 322 and a trailer control portion 324 lead and follow, respectively, a payload portion 326. In each of the data unit types 300, 306, 312, and 320, the payload portion may typically include such information as application or user data, while the control portion may, for example, be more likely to contain addressing, error detection/correction, and sequencing information.

Figure 4A:
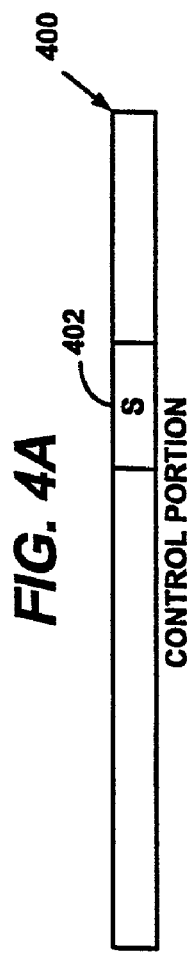
FIGS. 4A–D are control portion maps illustrating data unit control portions according to embodiments of the present invention.
Figure 4B:
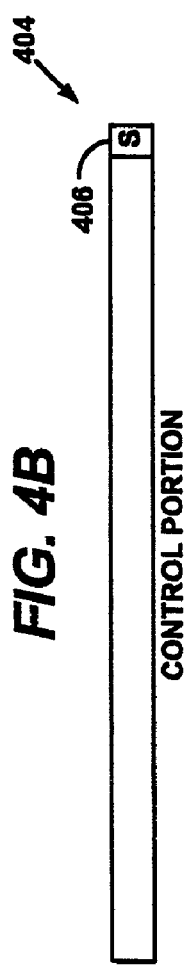
Figure 4C:
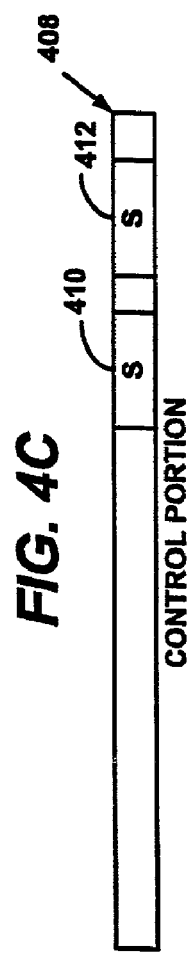
Figure 4D:
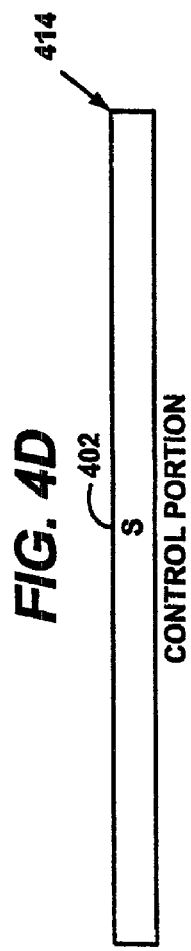

FIGS. 4A–D are control portion maps illustrating data unit control portions according to embodiments of the present invention. In FIG. 4A, the control portion 400 includes an event status indicator 402 intermediate within the control portion 400. In FIG. 4B, a second type of control portion 404 includes an event status indicator 406 as the last part of the control portion 404. Similarly, the event status indicator 406 may be located at the beginning (far left) of the control portion 404. In FIG. 4C, the control portion 408 includes two event status indicator fields 410 and 412, which may either be used to provide separate event status information types, or may be used in combination to provide a single type of event status information. In FIG. 4D, the control portion 414 is comprised entirely of an event status indicator 402. As illustrated by FIGS. 4A–C, many possibilities exist for placement of the event status indicator within the control portion of a data unit. Preferably, the event status indicator will be consistently placed in any given system for communicating an event status across a data channel according to the present invention.

Figure 5:
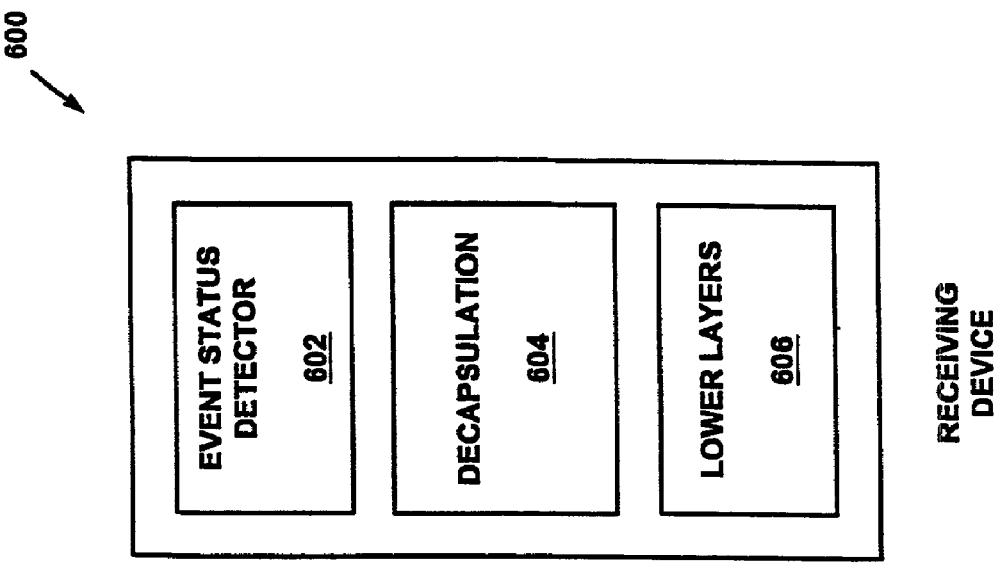
FIG. 5 is a simplified block diagram illustrating an originating device 500, according to an embodiment of the present invention.
Figure 6:
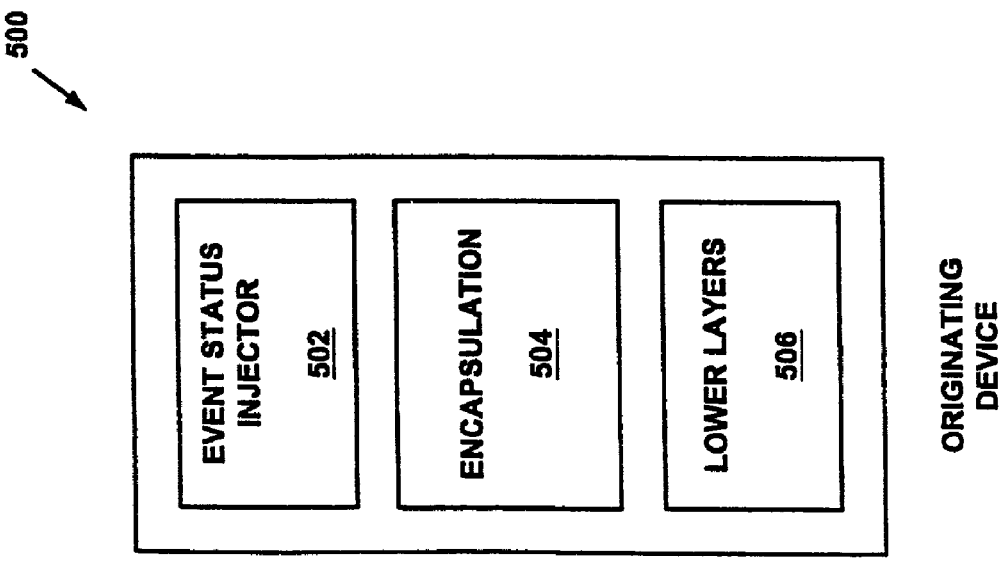
FIG. 6 is a simplified block diagram illustrating a receiving device, according to an embodiment of the present invention.

FIGS. 5 and 6 respectively illustrate an originating device 500 and a receiving device 600 that may be used in the system 100 according to one embodiment of the present invention.

C. The Originating Device

The originating device 500 includes an event status injector 502, an encapsulation module 504, and lower layers 506.

The event status injector 502 is operable to set an event status indicator in a control portion of a data unit transmitted by the originating device 500 to a receiving device 600 across a data channel. Operations performed by the event status injector 502 may include, but are not limited to, detecting the occurrence of an event, coding a representation of the event as an event status indicator, and placing the event status indicator into a control portion of a data unit. In its simplest form, the event status injector may change a bit or bit sequence in the control portion of the data unit to indicate the occurrence or non-occurrence of an event.

Examples of event status include a buffer overflow condition, a buffer underflow condition, and a line status. A First-In-First-Out (FIFO) buffer underflow condition may be indicated if the data rate is being monitored at the transmitting end. The line status may, for example, be an incoming line status, such as a Loss Of Signal condition on the incoming line. The actual event status is likely to be highly situational, and may differ depending on the particular application.

The encapsulation module 504 may perform such operations as segmenting a data signal into data signal segments to be placed in cells of fixed length, assembling control information with the data to be transmitted, and, in some embodiments, assisting with setting the event status indicator.

The lower layers 506 within the originating device 500 will depend on the nature of the originating device 500 and the data transmission system in which it is used. For example, various physical layer functions may be performed at the lower layers 506.

D. The Receiving Device

The receiving device 600 in FIG. 6 includes an event status detector 602, a decapsulation module 604, and lower layers 606.

The event status detector 602, in its simplest form, may read a bit or bit sequence from the control portion and forward it on to more intelligent circuitry or software. Additionally, the event status detector 602 may also be involved in decoding the event status indicator to determine the actual event status. The actual event status may be, for example, a binary representation of whether an event occurred, or it may be more complex, such as a multi-valued system of codes, with each code corresponding to a different event status.

Examples of event status include a buffer overflow condition, a buffer underflow condition, and a line status. A First-In-First-Out (FIFO) buffer underflow condition may be indicated if the data rate is being monitored at the transmitting end. The line status may, for example, be an incoming line status, such as a Loss Of Signal condition on the incoming line. The actual event status is likely to be highly situational, and may differ depending on the particular application.

The decapsulation module 604 is operative to convert the one or more data units into a recovered data signal. The decapsulation module 604 may assist with reassembling involved in the reassembly of data signal segments from the individual data units into a data signal (the recovered data signal). Other functions may also be performed by the decapsulation module 604, including separating a data unit into a control portion and a data portion, and possibly parsing out an event status indicator from a control portion.

The lower layers 606 may be similar to or identical to the lower layers 506, except in the case where the originating device 500 is only a transmitter and/or the receiving device 600 is only a receiver in contrast to the case where the originating device 500 and the receiving device 600 are both transceivers.

II. System for Communicating an Event Status Across an ATM Connection

A. Asynchronous Transfer Mode (ATM)—CBR Data

Figure 7:
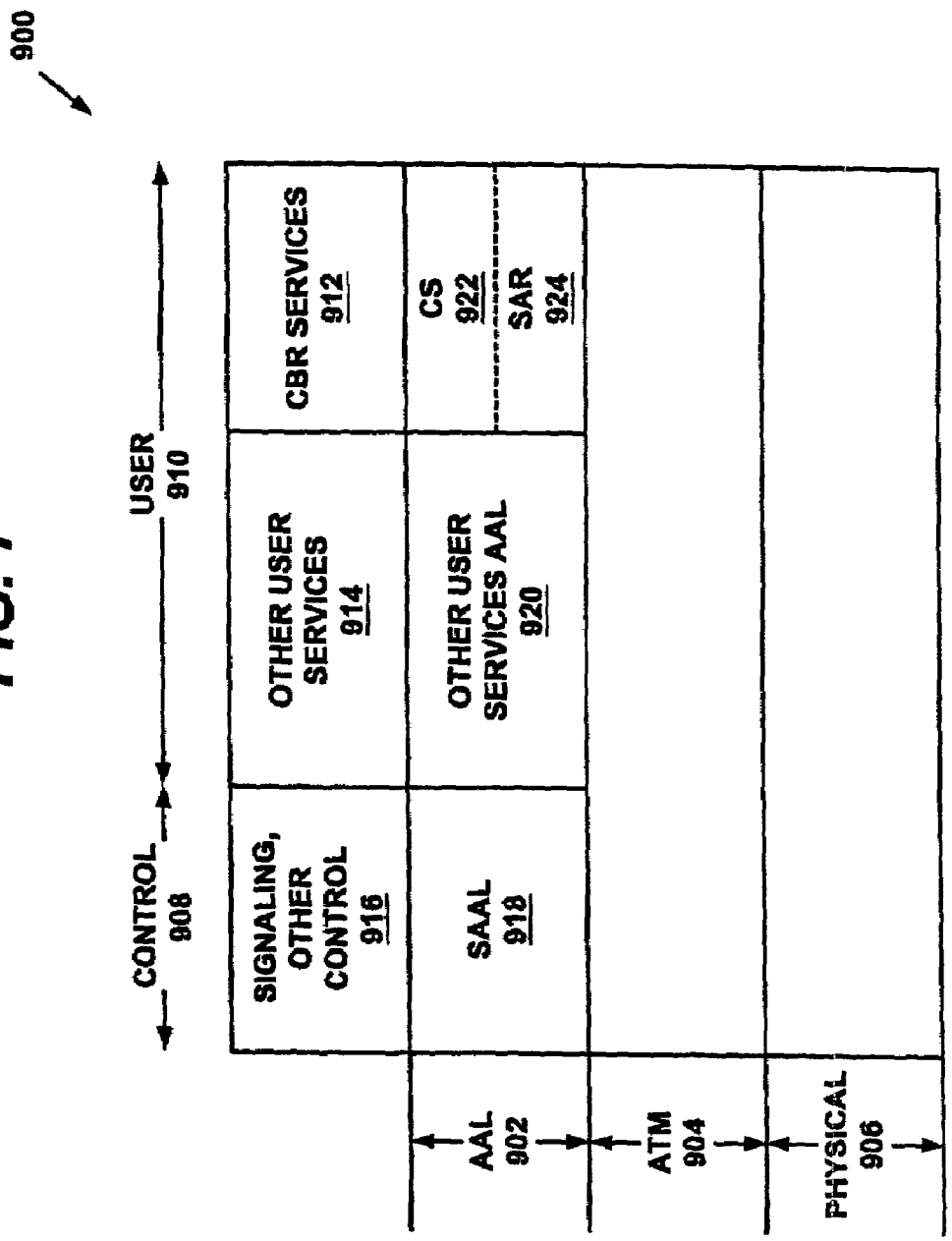
FIG. 7 is a protocol stack diagram illustrating a portion of an ATM protocol stack operable to handle CBR services, according to the present invention.

FIG. 7 is a protocol stack diagram illustrating a portion of an ATM protocol stack 900 operable to handle CBR services according to the present invention. The protocol stack 900 includes an ATM adaptation layer (AAL) 902, an ATM layer 904, and a physical layer 906. The protocol stack 900 additionally includes a control plane 908 and a user plane 910. As those having skill in the field of data communications will appreciate, the protocol stack diagram 900 will also likely contain additional layers and planes, such as for management.

The user plane 910 is responsible for user information, such as CBR services 912 and other user services 914. CBR services will typically allow ATM to emulate voice or DSn (n=0, 1, or 3) traffic. Other user services may include Variable Bit-Rate (VBR) service and other traffic types. The advantages provided by the present invention may be most beneficial to CBR services, because of the limits imposed on timing and call length. CBR services 912 will be discussed in more detail with reference to FIGS. 7–10.

The control plane 908 performs call and connection control functions, including call set-up, supervision, and release. As depicted in the figure, it is generally responsible for signaling and other control functions 916.

The AAL 902 serves as the highest layer for the user plane 910 and the control plane 908. The AAL 902 differs for the control plane 908 and the user plane 910. The control plane 908 includes a signaling ATM adaptation layer (SAAL) 918, while the user plane 910 ensures appropriate service characteristics for the other user services 914 and the CBR services 912. The SAAL 918 will likely contain additional sub-layers, as those having skill in the field of data communications will appreciate. There is preferably a separate other user services AAL 920 for the other user services 914. The AAL for the CBR services 912 is preferably split into two sub-layers: a Convergence Sub-layer (CS) 922 and a Segmentation And Reassembly (SAR) sublayer 924. The CS 922 is responsible for generating fixed-length packets from user application data (such as CBR services) and passing the packets down to the SAR sublayer 924. The SAR sublayer 924 is responsible for generating a 48-octet payload of an ATM cell. The CS 922, SAR sublayer 924, and CBR services in general are described in detail in "Broadband ISDN-ATM Adaptation Layer for Constant Bit Rate Services Functionality and Specification," ANSI T1 S1/92-570, Nov. 13, 1992, which is incorporated by reference herein. Generally, the SAR sublayer 924 is defined to perform transport and bit error detection (and possibly correction) of protocol control information from the CS 922. The CS 922 is defined to perform a set of service-related functions. Primitives and parameters for the CS 922 and the SAR sublayer 924 are set forth in the ANSI specification referenced above. In a preferred embodiment of the present invention, these defined primitives and/or parameters are modified to enable communication of an event status across a data channel, as will be described in further detail with reference to FIGS. 7–10.

The ATM layer 904 adds five octets of control information (as a header) to the payload sent by the AAL 902 to form an ATM cell. The header information ensures that the ATM cell is sent on the correct ATM connection. The physical layer 906 defines the electrical and/or optical characteristics and the network interfaces. This is also where bits from the upper layers are put on the transmission medium. The physical layer 906 is also likely to be subdivided into at least two sub-layers.

The following references are related to the present invention and are incorporated by reference herein:

ANSI T1.ATM-199X, *Broadband ISDN—ATM Layer Functionality and Specification;*

ANSI T1.102-(revision of 1987 version), *Digital Hierarchy—Electrical Interfaces;*

ANSI T1.107-1988, *Digital Hierarchy—Formats Specifications;*

ANSI T1.403-1991, *Carrier-to-Customer Installation—DS1 Metallic Interface;*

ANSI T1.404-101, *Carrier-to-Customer Installation—DS3 Metallic Interface;*

CCITT Recommendation G.824,—The control of jitter and wander within digital networks which are based on the 1544 Kb/s hierarchy, CCITT recommendation from the 1988 Blue Book, available from the American National Standards Institute, 1430 Broadway, New York, N.Y. 10018;

TR-TSY-000191, "Alarm Indication Signal Requirements and Objectives," Bellcore Technical Reference, Issue 1, May 1986.

The specifications referenced above may be used to provide a foundation for a system for communicating event status according to embodiment of the present invention. In a general sense, the event status information is conveyed by modifying the structure defined in these references to produce an event status indicator that may be used to communicate event status from an originating device to a receiving device.

Figure 8:
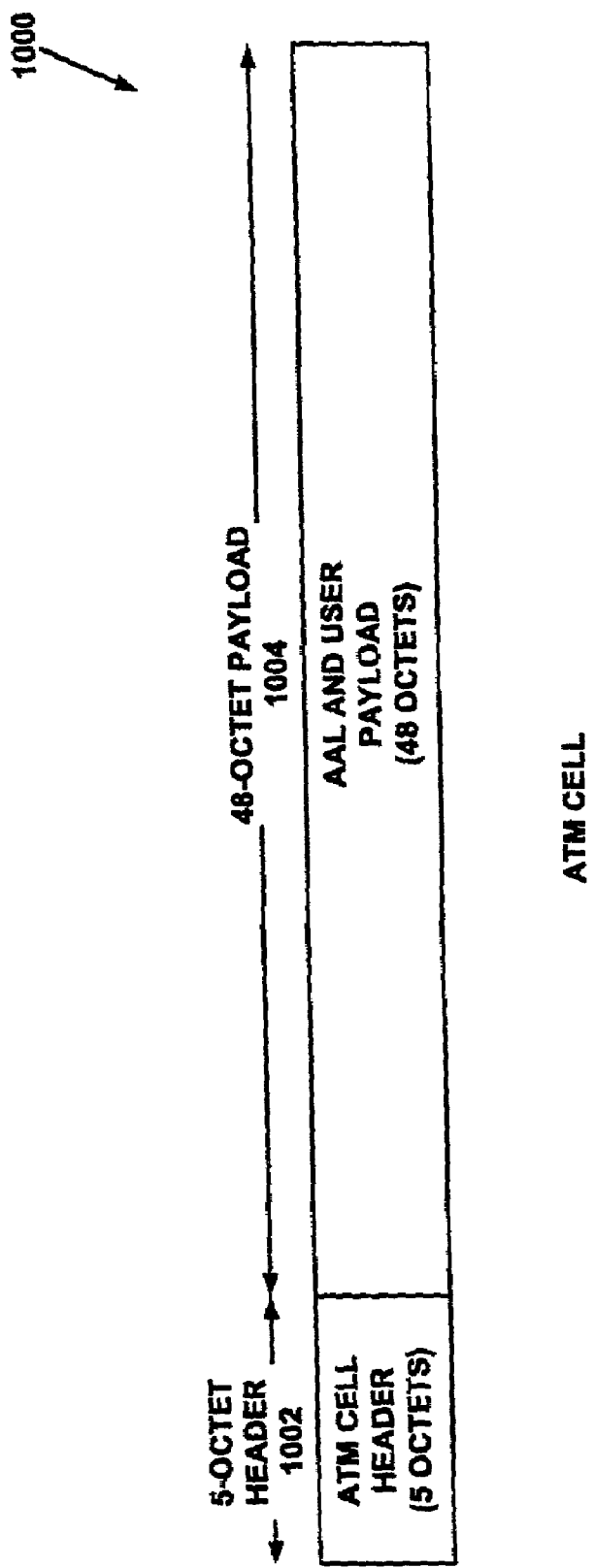
FIG. 8 is a data unit map illustrating an exemplary ATM cell.

FIG. 8 is a data unit map illustrating an ATM cell 1000. The ATM cell 1000 includes a 5-octet header 1002 and a 48-octet payload 1004. The 5-octer header 1002 is the control portion of the ATM cell 1000, and is defined to include fields for flow control, identification of virtual paths and virtual channels, a specification of payload type, a cell loss priority bit, and a header error control octet. The header error control octet is used for error correction on the other bits in the header, and enables an ATM switch to detect multiple errors and correct single errors. This ATM cell header representation is one example of a control portion of a data unit, where the data unit is the ATM cell. An example of an event status indicator is a portion of the header error control octet being used to convey event status information instead of its usual purpose of error correction or detection. This is an alternative embodiment of the present invention, and the preferred embodiment is for the event status indicator to be located in a control portion of a data unit produced by the SAR 924 in the AAL 902 (type 1 for CBR data). The 48-octet payload includes the SAR protocol data unit which is described in further detail with reference to FIG. 11. This 48-octet payload 1004 essentially consists of payload from the AAL 902 (including control information).

Figure 9:
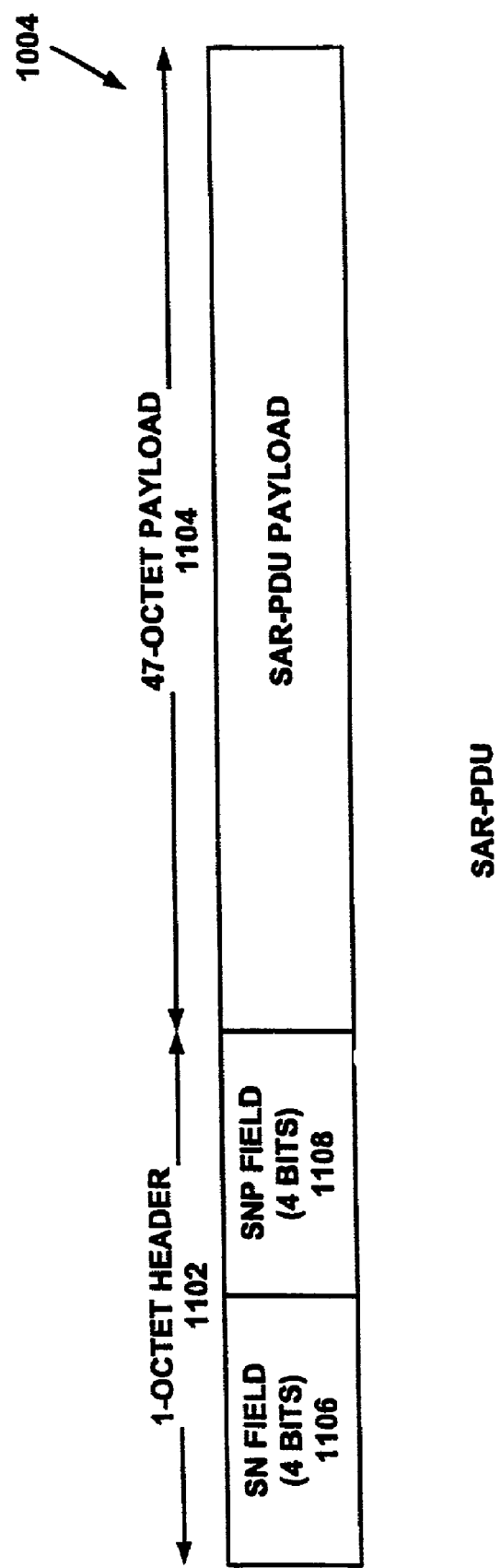
FIG. 9 is a data unit map illustrating an exemplary SAR-Protocol Data Unit.

FIG. 9 illustrates a data unit map of an SAR-PDU (SAR-Protocol Data Unit) 1004 that is typically used for CBR data. The SAR-PDU 1004 consists of a 1-octet header 1102 and a 47-octet payload 1104. The 1-octet header 1102 is the control portion of the SAR-PDU 1004, and the 47-octet payload 1104 is the payload portion of the SAR-PDU 1004. In the CBR-services context, the 47-octet payload 1104 includes a data signal or a segment of a data signal as constructed by the CS sub-layer 922 and the SAR sub-layer 924. The 1-octet header 1102 is defined to have two fields: an SN (Sequence Number) field 1106 and an SNP (Sequency Number Protection) field 1108. The 1-octet header 1102 is described in further detail with reference to FIG. 10.

Figure 10:
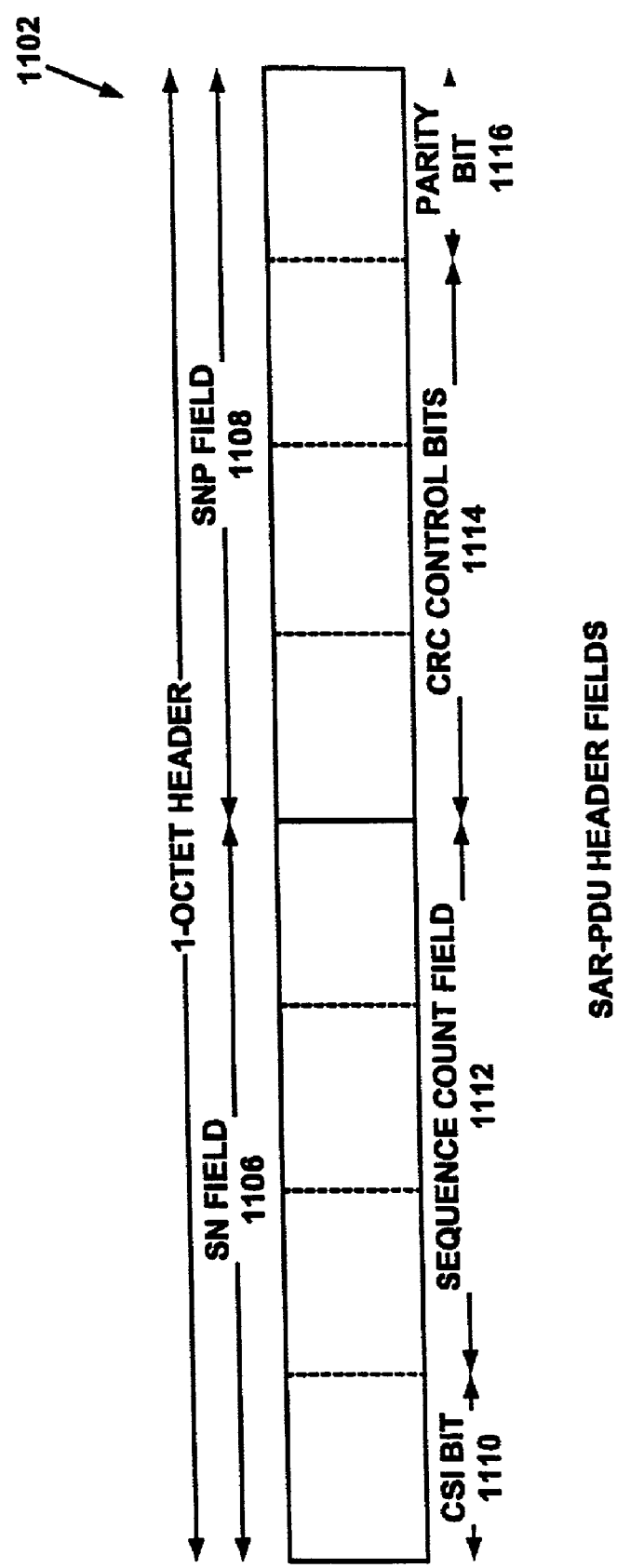
FIG. 10 is a data unit-control portion map illustrating an SAR-PDU header as a control portion, according to an embodiment of the present invention.

FIG. 10 is a data unit-control portion map illustrating an SAR-PDU header 1102, which may serve as a control portion according to the present invention. The SAR-PDU header 1102 includes the SN field 1106 and the SNP field 1108.

The SN field 1106 is a 4-bit field containing a 1-bit Convergence Sub-layer Indication (CSI) sub-field 1110 and a 3-bit Sequence Count (SC) sub-field 1112. The CSI sub-field 1110 is reserved for service-specific functions of the CS 922. The SC sub-field 1112 is defined to be used for the transport of a binary-encoded sequence count. In one embodiment of the present invention, the data unit is the SAR-PDU 1004, the control portion is the SAR-PDU header 1102, and the event status indicator makes use of the three bits in the SC field 1112. For example, an event status, such as a queue overflow, may be communicated by transmitting an out-of-sequence SAR-PDU header (i.e., inserting an incorrect sequence count value). A receiving device having knowledge of this coding scheme would then be able to determine the event status signaled by the out-of-sequence SAR-PDU header. In such an embodiment, the use of the SC field 1112 may be entirely for communication of event status information instead of communication of sequence count information. This may be acceptable in reliable connections having a low probability for ATM cells to arrive out-of-sequence at a receiving device.

The SNP field 1108 contains a 3-bit CRC (Cyclic Redundancy Check) code sub-field 1114 and a 1-bit parity check sub-field 1116. The 3-bit CRC code sub-field 1114 is defined to provide error detection and correction using well-known techniques. The parity bit 1116 is defined to make the entire SNP field either an even-parity value or an odd-parity value, depending on the parity specification. In a preferred embodiment of the present invention, the data unit is an SAR-PDU 1004, the control portion is an SAR-PDU header 1102, and the event status identifier makes use of the CRC sub-field 1114 to communicate event status across a data channel to a receiving device. For example, an event status, such as a queue overflow, may be communicated to a receiving device by sending a corrupted SAR-PDU header. One method of indicating a corrupted SAR-PDU header is by providing an improper CRC code in the CRC sub-field 1114. If the receiving device has knowledge of the coding used to communicate the event status information, it will be able to determine the event status. The use of the CRC sub-field for communicating event status information (instead of for detecting and correcting errors) may be acceptable in reliable transmission systems, in which errors are unlikely to occur, and/or in which errors may be detected by means other than the CRC sub-field 1114. Alternative embodiments may utilize the parity bit 1116 or combinations of the CRC sub-field 1114, the parity bit 1116, and the sequence count field 1112, for example. Other types of data units (and other control portions) may also be utilized in the present invention.

Figure 11:
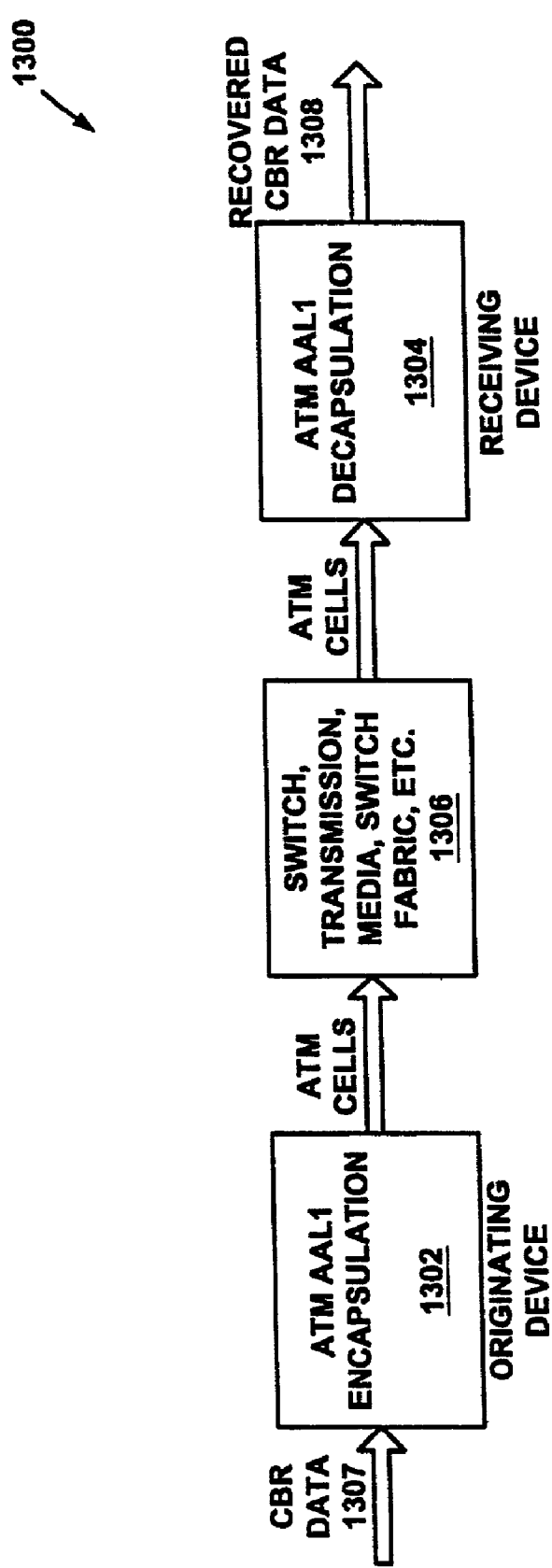
FIG. 11 is a simplified block diagram illustrating an ATM system for communicating an event status across a data channel in which CBR data is used, according to an embodiment of the present invention.

FIG. 11 illustrates an ATM system 1300 for communicating an event status across a data channel in which CBR data is used. The system 1300 includes an ATM originating device 1302, an ATM receiving device 1304, and a data channel, which is represented in the system 1300 by switch, transmission, media, switch fabric 1306. A CBR data signal 1307 is received at the originating device 1302 and is encapsulated (segmented and placed into ATM cells). This encapsulation occurs at the ATM AAL layer, which will be a Type 1 AAL layer for CBR data. The encapsulated CBR data is transmitted as ATM cells through the switch, transmission, media, switch fabric 1306 to the receiving device 1304. At the receiving device 1304, the received ATM cells are decapsulated at an ATM AAL 1 layer and the recovered CBR data signal 1308 results.

Figure 12:
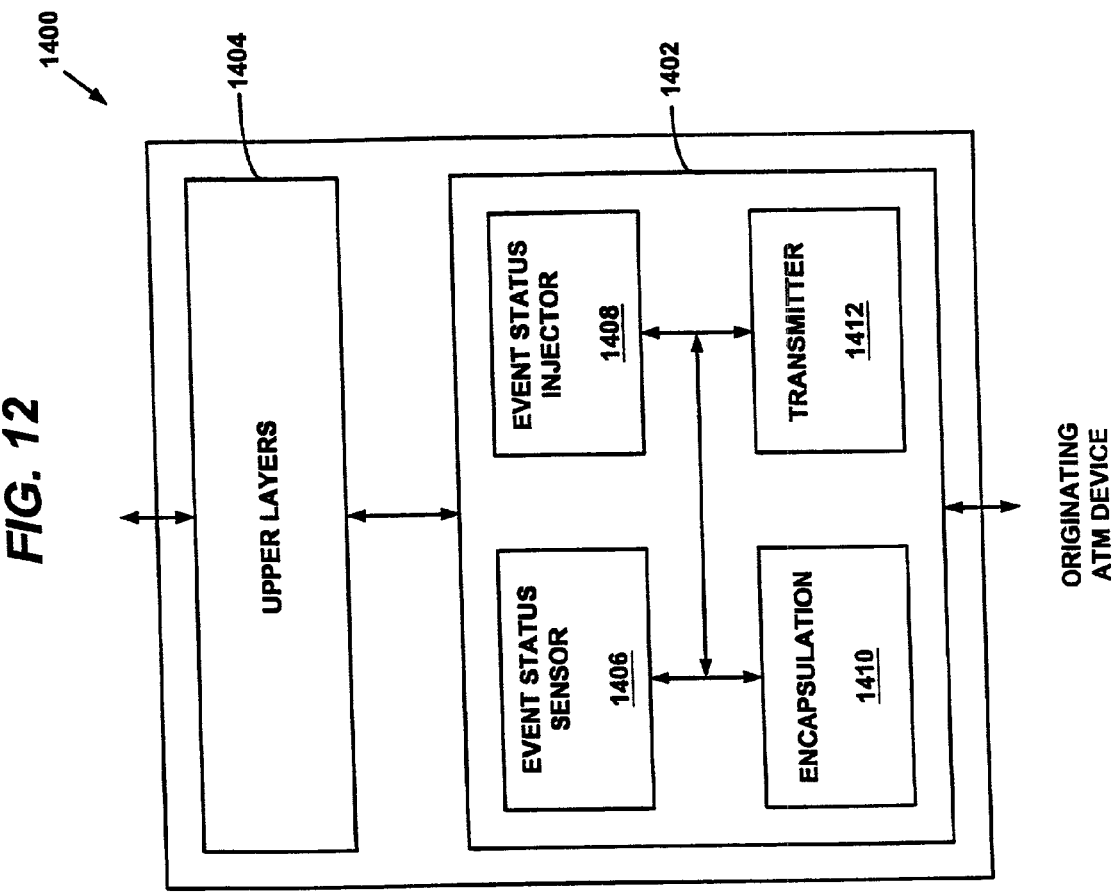
FIG. 12 is a simplified block diagram illustrating an originating ATM device, according to an embodiment of the present invention.

FIG. 12 is a high-level functional block diagram illustrating an originating ATM device 1400 according to an embodiment of the present invention. The originating device 1400 includes an apparatus 1402 for communicating an event status across a data channel to a receiving ATM device and an additional ATM device functionality module 1404. The apparatus 1402 includes an event status sensor 1406, an event status injector 1408, an encapsulation module 1410, and a transmitter 1412. The event status sensor 1406 comprises hardware, firmware, or software to detect an event status condition, such as a queue overflow.

The event status sensor 1406 may include the functionality to actually detect the event status or may simply receive a notification signal identifying the event status.

The event status injector 1408 codes the event status into an event status indicator to be included within a control portion of a data unit. For example, an out-of-sequence SAR-PDU header may indicate an event status condition such as a queue overflow, a queue underflow, or an incoming line status. In an alternative embodiment, the event status sensor 1406 and the event status injector 1408 are combined into a single component within the apparatus 1402, and may consist entirely or partially of software or firmware instructions.

The encapsulation module 1410 may perform such functions as segmenting a data signal into data units and adding control information to the data units. In a preferred embodiment, the encapsulation module 1410 includes the AAL 1 encapsulation of CBR data and control information in an SAR-PDU header, as well as creating an ATM cell from the SAR-PDU. In one embodiment, the event status sensor 1406, the event status injector 1408, and the encapsulation module 1410 are composed within one component of the apparatus 1402.

The transmitter 1412 performs physical layer functions, such as placing ATM cells onto a transmission medium.

The additional ATM device functionality module 1404 includes all other components within an originating ATM device, such as those used in known ATM devices. Examples of additional ATM device functionality include management and control functions, as well as one or more user interfaces.

Figure 13:
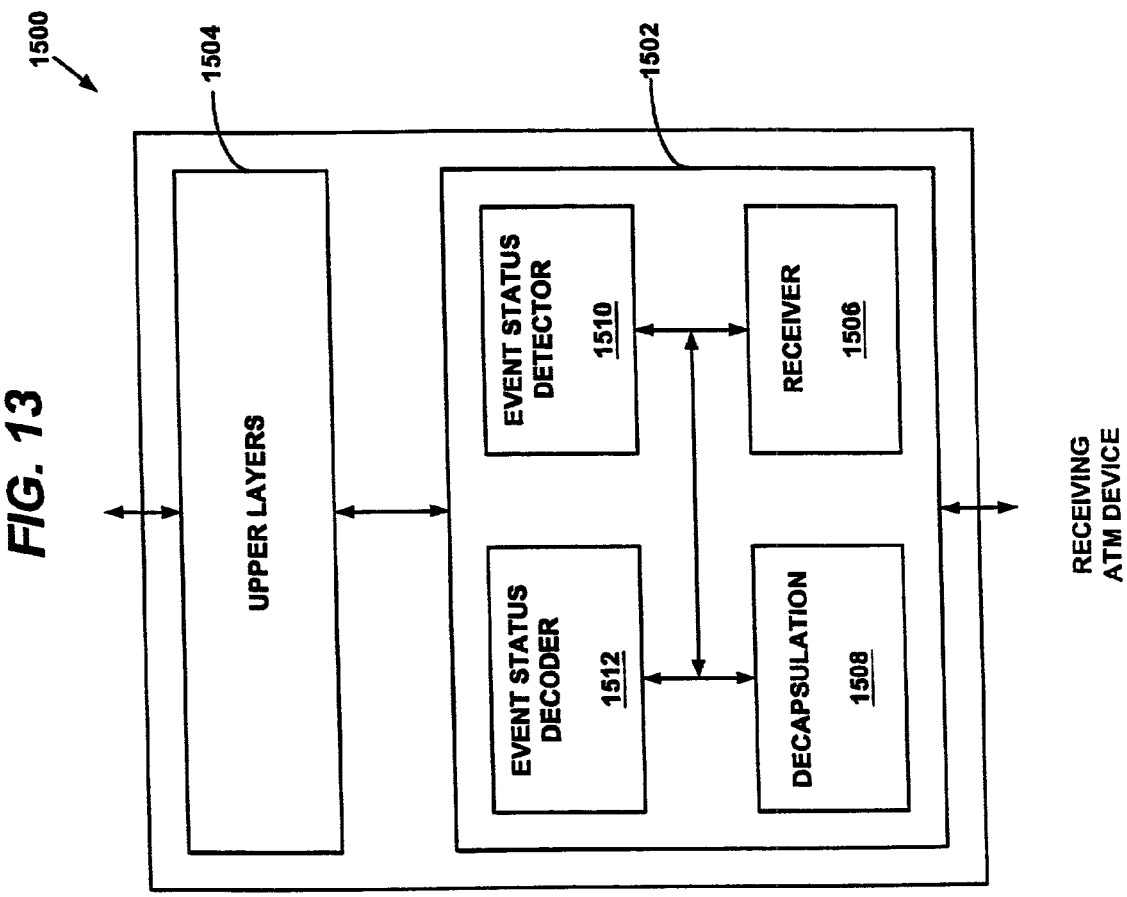
FIG. 13 is a simplified block diagram illustrating a receiving ATM device, according to an embodiment of the present invention.

FIG. 13 is a simplified high-level block diagram of a receiving ATM device 1500 according to one embodiment of the present invention. The receiving ATM device 1500 includes an apparatus 1502 for receiving an event status communicated across the data channel from an originating ATM device, and additional ATM functionality module 1504.

The apparatus 1502 includes a receiver 1506, a decapsulation module 1508, an event status detector 1510, and an event status decoder 1512.

The receiver 1506 performs physical layer functions, including receiving ATM cells from the transmission medium, for example.

The decapsulation module 1508 performs such functions as separating a control portion from a payload portion of a data unit, and may also reassemble data signal segments stored in the payload portions into a data signal.

The event status detector 1510 detects the event status indicator within the control portion of a data unit (which may be part of a SAR-PDU, such as a SAR-PDU header). The event status detector 1510 may, for example, examine pre-specified fields within a control portion of a data unit and may record the bit values of those pre-specified fields.

The event status decoder 1512 may, in turn, take the bit values from the event status detector 1510 and may determine what event status is signaled by the value of the bits detected by the event status detector 1510. For example, a corrupted and irrecoverable SAR-PDU header may indicate an event status, such as a queue overflow or underflow condition. Other examples of event status include a buffer underflow condition and a line status. A First-In-First-Out (FIFO) buffer underflow condition may be indicated if the data rate is being monitored at the transmitting end. The line status may, for example, be an incoming line status, such as a Loss Of Signal condition on the incoming line. The actual event status is likely to be highly situational, and may differ depending on the particular application.

The additional ATM device functionality module 1504 may be very similar to or identical to the additional ATM device functionality module 1404 in the originating ATM device 1400.

The decapsulation module 1508, the event status detector 1510, and the event status decoder 1512 may be combined into one or more sub-components within the receiving ATM device 1500. In addition, both the originating ATM device 1400 and the receiving device 1500 may include additional functionality to allow for bi-directional data communication, instead of merely originating or receiving data, respectively.

III. Method for Communicating an Event Status Across a Data Channel

Figure 14:
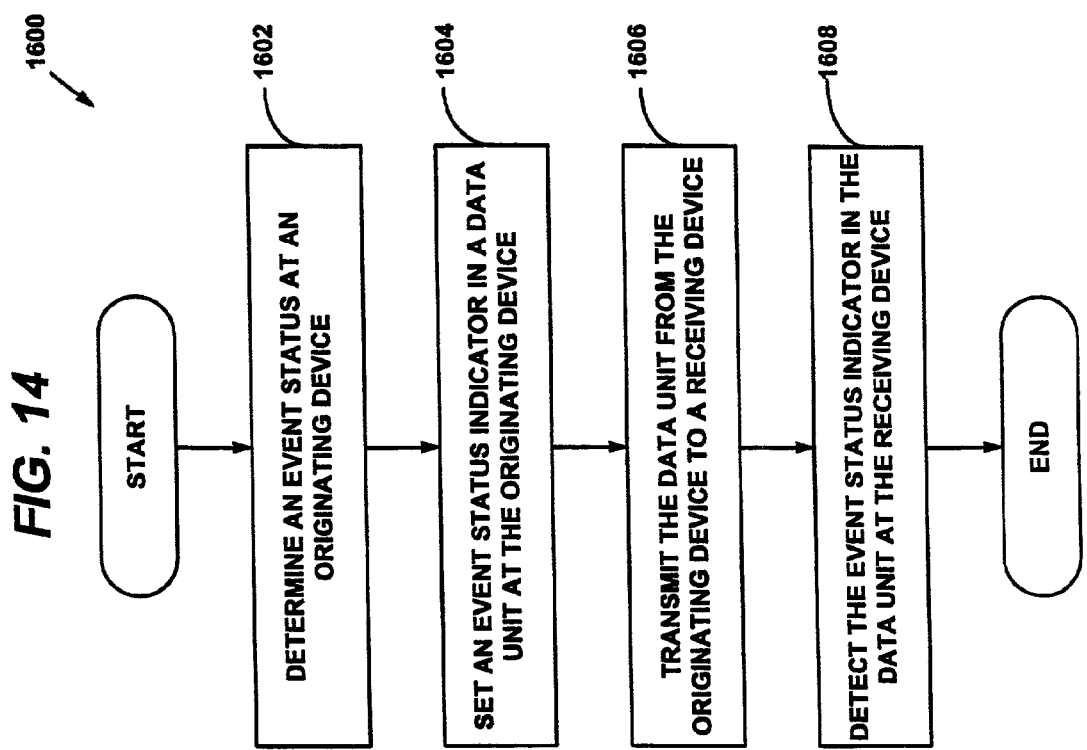
FIG. 14 is a flow diagram illustrating a method for communicating an event status across a data channel, according to an embodiment of the present invention.

FIG. 14 is a flow diagram illustrating a method 1600 for communicating an event status across a data channel according to an embodiment of the present invention. In block 1602, an event status is determined at an originating device. In block 1604, an event status indicator is set in a control portion of a data unit at the originating device. The event status indicator identifies an event status, and the data unit communicates a data signal. In block 1606, the data unit is transmitted on a data channel from the originating device to a receiving device. The data channel is one of a plurality of communication channels supported on a data path using data transport protocols. The data path links the originating device to the receiving device. In block 1608, the event status indicator is detected in the control portion of the data unit at the receiving device.

Figure 15:
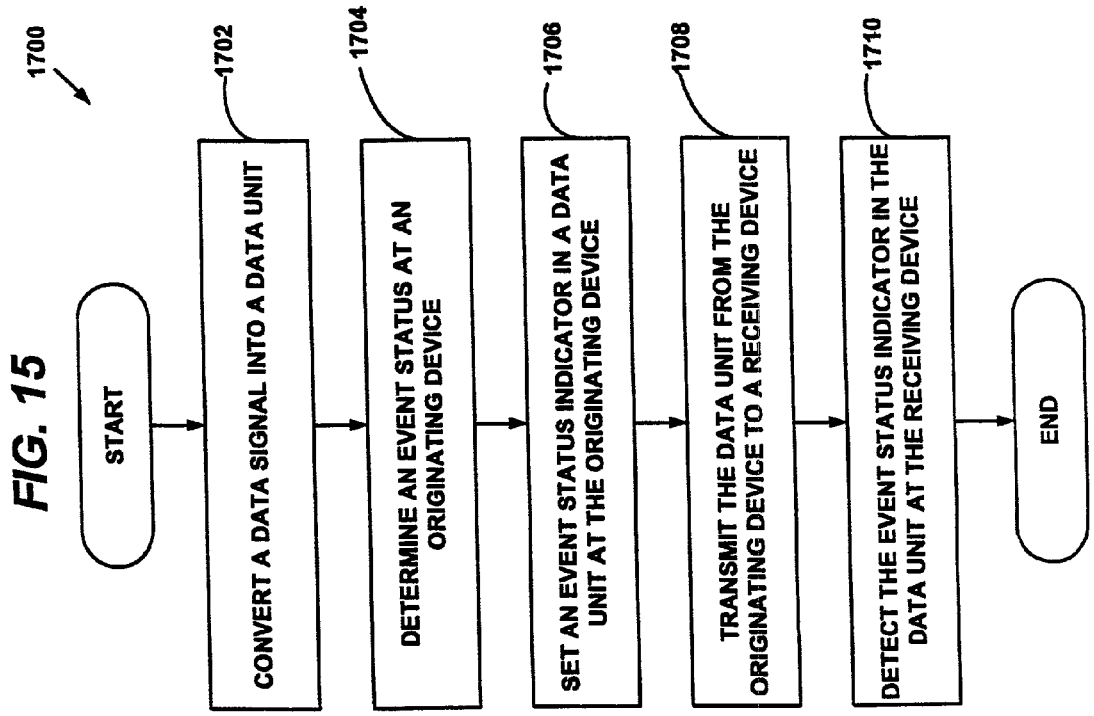
FIG. 15 is a flow diagram illustrating a method for communicating an event status across a data channel, according to an alternative embodiment of the present invention.

FIG. 15 is a flow diagram illustrating a method 1700 for communicating an event status across a data channel according to an alternative embodiment of the present invention. Blocks 1704, 1706, 1708, and 1710 of method 1700 correspond to blocks 1602, 1604, 1606, and 1608, respectively, in the method 1600 illustrated in FIG. 14. In block 1702, the data signal is converted into the data unit at the originating device.

Figure 16:
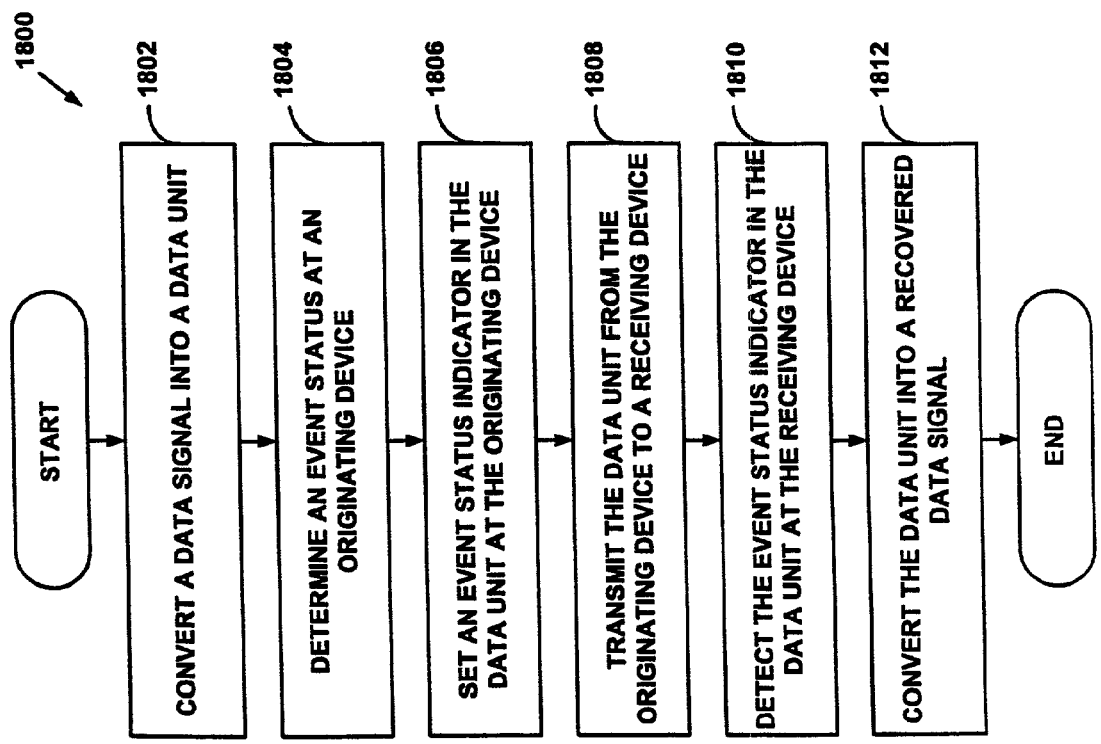
FIG. 16 is a flow diagram illustrating a method for communicating an event status across a data channel, according to another alternative embodiment of the present invention.

FIG. 16 is a flow diagram illustrating a method 1800 for communicating an event status across a data channel according to another alternative embodiment of the present invention. Blocks 1802, 1804, 1806, 1808, and 1810 of method 1800 correspond to blocks 1702, 1704, 1706, and 1708, respectively, of method 1700 illustrated in FIG. 15. In block 1812, the data unit is converted into a recovered data signal at the receiving device. The recovered data signal will preferably be identical to the data signal transmitted by the originating device. The order of the blocks in FIG. 16 need not be as shown to implement the present invention. Alternative orderings may also be used.

Figure 17:
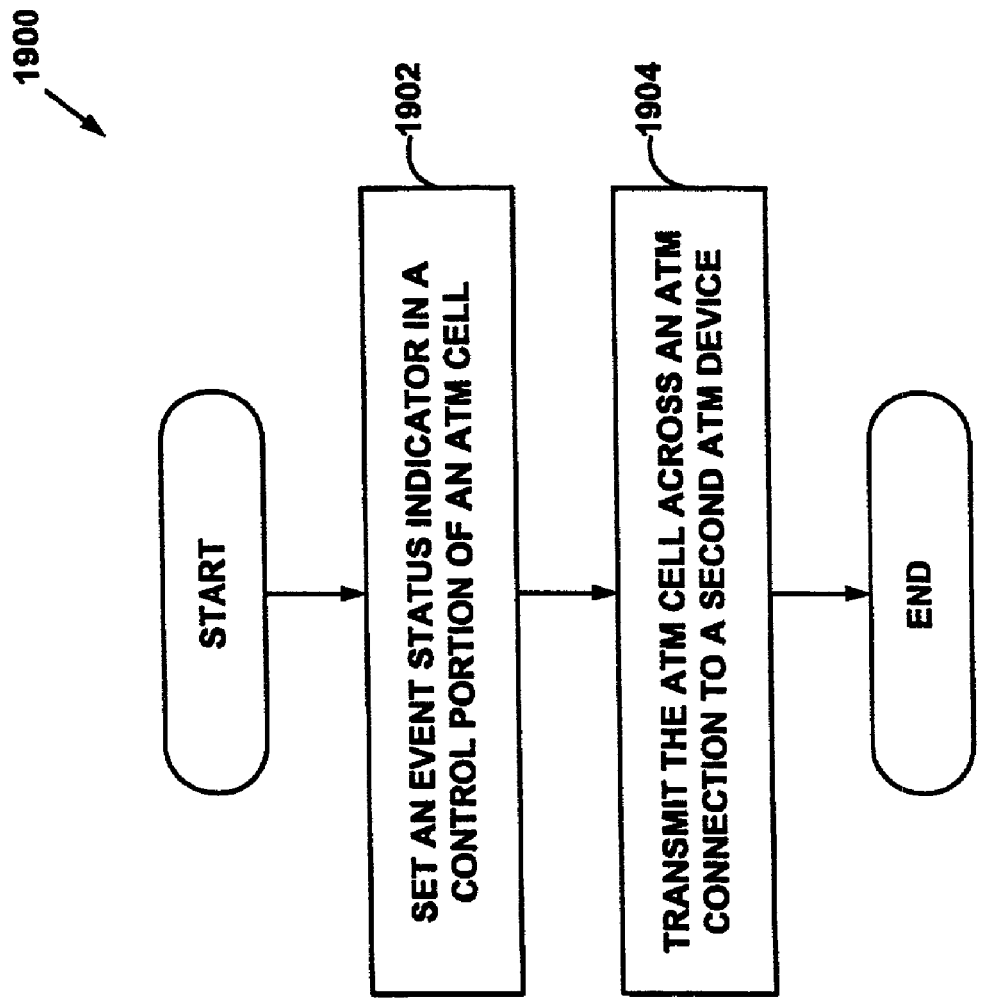
FIG. 17 is a flow diagram illustrating a method for communicating an event status in a first ATM device operable to communicate ATM cells to a second ATM device.

FIG. 17 is a flow diagram illustrating a method 1900 for communicating an event status in a first ATM device operable to transmit ATM cells via an ATM connection to a second ATM device. The first ATM device is an originating device, and the second ATM device is a receiving device. In block 1902, an event status indicator is set in a control portion of an ATM cell. The event status indicator signals an event status detected at the first ATM device. In block 1904, the ATM cell is transmitted across the ATM connection to the second ATM device.

Figure 18:
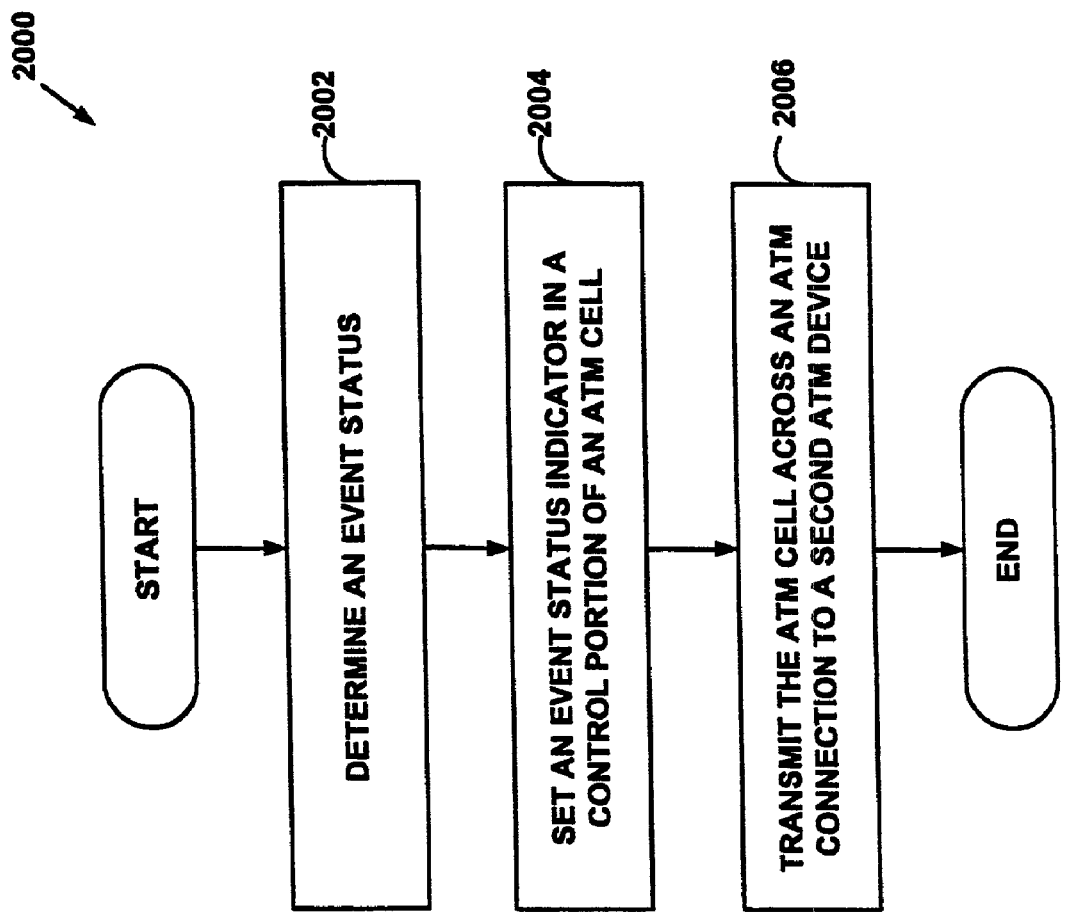
FIG. 18 is a flow diagram illustrating a method for communicating an event status from a first ATM device to a second ATM device, according to an embodiment of the present invention.

FIG. 18 is a flow diagram illustrating a method 2000 for communicating an event status in a first ATM device operable to transmit ATM cells via an ATM connection to a second ATM device according to an alternative embodiment of the present invention. Blocks 2004 and 2006 correspond to blocks 1902 and 1904 in the method 1900. In block 2002, the first ATM device determines an event status.

Figure 19:
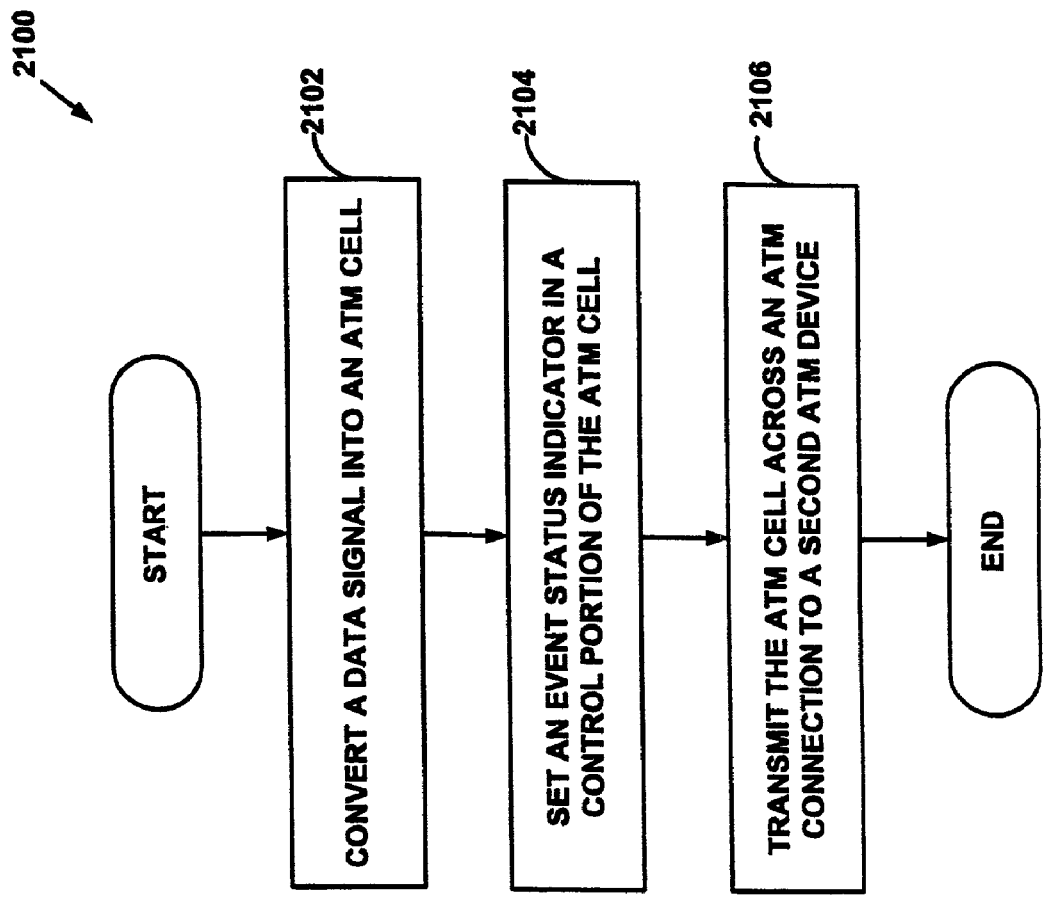
FIG. 19 is a flow diagram illustrating a method for communicating an event status from a first ATM device to a second ATM device, according to an embodiment of the present invention.

FIG. 19 is a flow diagram illustrating a method 2100 for communicating an event status across a data channel in a first ATM device operable to transmit ATM cells via an ATM connection to a second ATM device, according to an embodiment of the present invention. Blocks 2104 and 2106 correspond to blocks 1902 and 1904 in the method 1900. In block 2102, the data signal is converted into an ATM cell. In an additional embodiment, an event status may be determined prior to the execution of block 2104.

FIG. 20 is a flow diagram illustrating a method 2200 for determining an event status across a data channel in a first ATM device operable to receive ATM cells via an ATM connection from a second ATM device, according to an embodiment of the present invention. In method 2200, the first ATM device is a receiving device, and the second ATM device is an originating device. In block 2202, an ATM cell is received across an ATM connection at the first ATM device. The ATM cell originated at the second ATM device. In block 2204, an event status indicator is detected in a control portion of the ATM cell. The event status indicator signals an event status detected at the second ATM device. In block 2206, the event status indicator is decoded to determine an event status.

FIG. 21 is a flow diagram illustrating a method 2300 for determining an event status in a first ATM device operable to receive ATM cells via an ATM connection from a second ATM device. Blocks 2302, 2304, and 2306 of method 2300 correspond to blocks 2202, 2204, and 2206, respectively of method 2200 illustrated in FIG. 20. In block 2308, the ATM cell is converted into a recovered data signal. The recovered data signal is preferably identical to the data signal operated on at the second ATM device. The order of the method blocks in the method 2300 need not be as shown. Alternative orderings may also be used to implement the present invention.

An operating environment for components of the present invention may include a processing system with at least one high speed Central Processing Unit ("CPU") and a memory. In accordance with the practices of persons skilled in the art of computer programming, the present invention is described above with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU.

Preferred and alternative embodiments of the present invention have been illustrated and described. It will be understood, however, that changes and modifications may be made to the invention without deviating from its true spirit and scope, as defined by the following claims.

I claim:

1. A system for communicating an event status across a data channel, comprising in combination:
    a data path to provide connectivity for a plurality of communication channels using data transport protocols;
    an originating device coupled to a first location on the data path, the originating device operable to set an event status indicator in a control portion of a data unit, the originating device operable to communicate a data signal as one or more data units on a data channel, the data channel being one of the plurality of communication channels supported on the data path, wherein the control portion is a SAR PDU header, and wherein the event status indicator is selected from a group consisting of an out of sequence SAR PDU header, a corrupted SAR PDU header, a corrupted and irrecoverable SAR PDU header, a parity bit in the SAR PDU header, a CRC field in the SAR PDU header, and a parity bit and CRC field in the SAR PDU header; and
    a receiving device coupled to a second location on the data path, the receiving device operable to detect the event status indicator in the control portion of the data unit, the receiving device operable to convert the one or more data units communicated on the data channel to a recovered data signal, the data path linking the originating device to the receiving device, the event status, wherein the event status is selected from the group consisting of a FIFO overflow condition, a FIFO underflow condition, and a line status, indicator identifying an event status, wherein the data signal and the recovered data signal include constant bit rate data, wherein the originating device and the receiving device are ATM devices and the data channel is an ATM channel, wherein the originating device further comprises an ATM encapsulation module operative to convert the data signal into the one or more data units, wherein the receiving device further comprises an ATM decapsulation module operative to convert the one or more data units into the recovered data signal, and wherein the data units are ATM cells, wherein the ATM encapsulation module includes an ATM AAL1 encapsulation block and the ATM decapsulation module includes an ATM AAL1 decapsulation block.

2. The system of claim 1, wherein the originating device further comprises an encapsulation module operative to convert the data signal into the one or more data units.

3. The system of claim 1, wherein the receiving device further comprises a decapsulation module operative to convert the one or more data units into the recovered data signal.

4. The system of claim 1, wherein the data signal and the recovered data signal are constant bit rate signals.

5. The system of claim 1, wherein the originating device includes an event status injector operable to set the event status indicator in the control portion of the data unit, and wherein the receiving device includes an event status detector operable to detect the event status indicator in the control portion of the data unit.

6. In an ATM device operable to transmit ATM cells via an ATM connection to a receiving ATM device, an apparatus for communicating an event status, comprising in combination:
    an event status sensor operable to determine an event status, wherein the event status is selected from the group consisting of a FIFO overflow condition, a FIFO underflow condition, and a line status;
    an encapsulation module operative to convert a data signal into one or more ATM cells, wherein the encapsulation module includes an ATM AAL1 encapsulation block, and wherein the data signal is a constant bit rate signal;
    an event status injector operable to set an event status indicator in a control portion of an ATM cell, the event status indicator signaling the event status, wherein the control portion is a SAR PDU header, and wherein the event status indicator is selected from the group consisting of an out of sequence SAR PDU header, a corrupted SAR PDU header a corrupted and irrecoverable SAR PDU header, a parity bit in the SAR PDU header, a CRC field in the SAR PDU header, and a parity bit and CRC field in the SAR PDU header; and
    a transmitter for communicating the ATM cell onto the ATM connection.

7. In an ATM device operable to receive ATM cells via an ATM connection from an originating ATM device, an apparatus for determining an event status, comprising in combination:
    a receiver for accepting an ATM cell from the ATM connection;
    a decapsulation module operative to convert the ATM cell received from the originating ATM device on the ATM connection into a recovered data signal, the ATM cell transmitted by the originating ATM device, the ATM cell including an event status indicator in a control portion of the ATM cell, the event status indicator set by the originating ATM device and indicating an event status, wherein the event status is selected from the group consisting of a FIFO overflow condition, a FIFO underflow condition, and a line status, wherein the event status indicator is selected from a group consisting of an out of sequence SAR PDU header, a corrupted SAR PDU header, a corrupted and irrecoverable SAR PDU header, a parity bit in the SAR PDU header, a CRC field in the SAR PDU header, and a parity bit and CRC field in the SAR PDU header, module includes an ATM AAL1 decapsulation block, and wherein the recovered data signal is a constant bit rate signal;

an event status detector operable to detect the event status indicator in the control portion of the ATM cell; and an event status decoder operable to decode the event status indicator to determine an event status.

8. A method for communicating an event status across a data channel, comprising, in combination:

determining an event status at an originating device, wherein the event status is selected from the group consisting of a FIFO overflow condition, a FIFO underflow condition, and a status line;

setting an event status indicator in a control portion of a data unit at the originating device, the event status indicator identifying an event status, the data unit communicating a data signal, wherein the event status indicator is selected from a group consisting of an out of sequence SAR PDU header, a corrupted SAR PDU header, a corrupted and irrecoverable SAR PDU header, a parity bit in the SAR PDU header, a CRC field in the SAR PDU header, and a parity bit and CRC field in the SAR PDU header, and wherein the control portion is a SAR PDU header;

transmitting the data unit on a data channel from the originating device to a receiving device, the data channel being one of a plurality of communication channels supported on a data path using data transport protocols, the data path linking the originating device to the receiving device;

detecting the event status indicator in the control portion of the data unit at the receiving device; and converting the data unit into a recovered data signal at the receiving device, wherein the data signal and the recovered data signal include constant bit rate data, wherein the originating device and the receiving device are ATM devices and the data channel is an ATM channel, wherein the originating device comprises an ATM encapsulation module operative to convert the data signal into one or more data units, wherein the receiving device comprises an ATM decapsulation module operative to convert the one or more data units into the recovered data signal, and wherein the data units are ATM cells, wherein the ATM encapsulation module includes an ATM AAL1 encapsulation block and the ATM decapsulation module includes an ATM AAL1 decapsulation block.

9. A computer readable medium having stored therein instructions for causing a processing unit to execute the method of claim 8.

10. The method of claim 8, further comprising the step of converting the data signal into the data unit at the originating device.

11. The method of claim 10, further comprising the step of converting the data unit into a recovered data signal at the receiving device.

12. The method of claim 11, wherein the data signal and the recovered data signal are constant bit rate signals.

13. The method of claim 8, wherein the originating device includes an event status injector operable to set the event status indicator in the control portion of the data unit, and wherein the receiving device includes an event status detector operable to detect the event status indicator in the control portion of the data unit.

14. In a first ATM device operable to transmit ATM cells via an ATM connection to a second ATM device, a method for communicating an event status, comprising in combination:

setting an event status indicator in a control portion of an ATM cell, the event status indicator signaling an event status detected at the first ATM device, wherein the event status is selected from the group consisting of a FIFO overflow condition, a FIFO underflow condition, and a line status, wherein the event status indicator is selected from a group consisting of an out of sequence SAR PDU header, a corrupted SAR PDU header, a corrupted and irrecoverable SAR PDU header, a parity bit in the SAR PDU header, a CRC field in the SAR PDU header, and a parity bit and CRC field in the SAR PDU header, to and wherein the control portion is a SAR PDU header;

transmitting the ATM cell across the ATM connection to the second ATM device: and converting a data signal into the ATM cell, wherein the data signal is converted into the ATM cell by an ATM AAL1 encapsulation block.

15. A computer readable medium having stored therein instructions for causing a processing unit to execute the method of claim 14.

16. The method of claim 14, further comprising the step of determining an event status.

17. The method of claim 14, wherein the data signal is a constant bit rate signal.

18. The method of claim 14, wherein the event status indicator is set by an event status injector.

19. In a first ATM device operable to receive ATM cells via an ATM connection from a second ATM device, a method for determining an event status, comprising in combination:

receiving an ATM cell across the ATM connection, the ATM cell originating at the second ATM device;

detecting an event status indicator in a control portion of the ATM cell, the event status indicator signaling an event status detected at the second ATM devise, wherein the event status is selected from the group consisting of a FIFO overflow condition, a FIFO underflow condition, and a line status, wherein the event status indicator is selected from the group consisting of an out of sequence SAR PDU header, a corrupted SAR PDU header, a corrupted and irrecoverable SAR PDU header, a parity bit in the SAR PDU header, a CRC field in the SAR PDU header, and a parity bit and CRC field in the SAR PDU header, and wherein the control potion is a SAR PDU header;

decoding the event status indicator to determine an event status; and converting the ATM cell into a recovered data signal, wherein the ATM cell is converted into the recovered data signal by an ATM AAL1 decapsulation block.

20. A computer readable medium having stored therein instructions for causing a processing unit to execute the method of claim 19.

21. The method of claim 19, wherein the recovered data signal is a constant bit rate signal.

22. The method of claim 19, wherein the event status indicator is detected by an eve at status detector.

* * * * *